Figure 1:
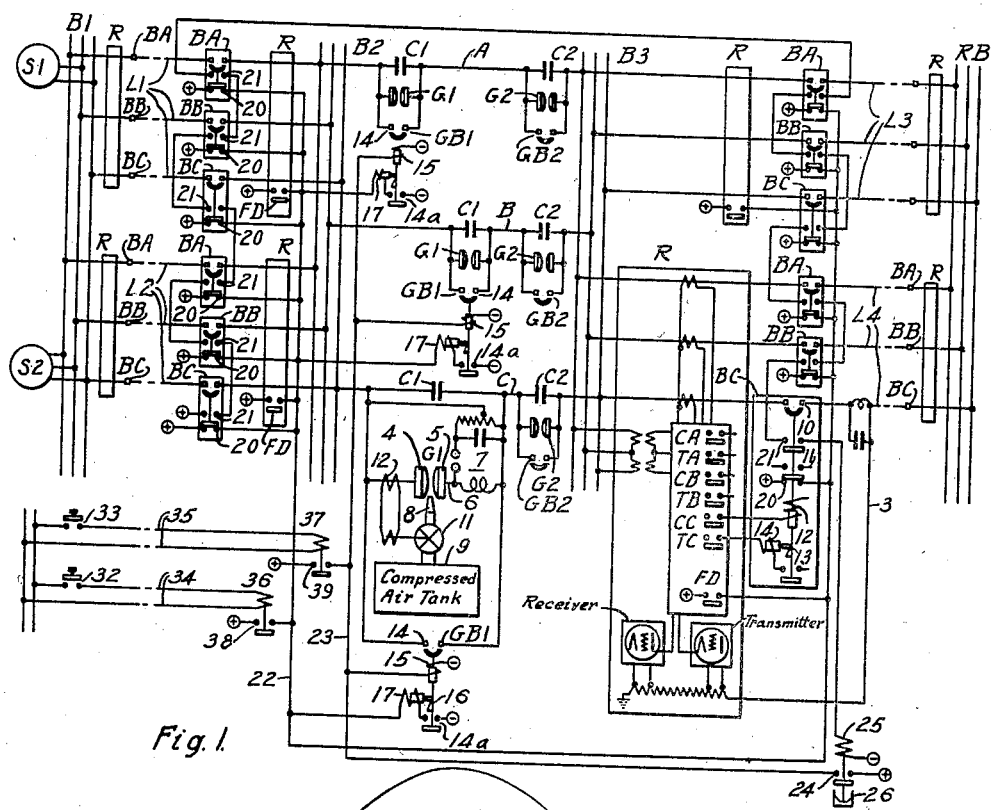

April 4, 1944.   R. D. EVANS ET AL   2,345,922
VARIABLE-SERIES CAPACITOR FOR STABILITY
Filed June 6, 1942

WITNESSES:

INVENTORS
Robert D. Evans and
Alexander C. Monteith.
BY
ATTORNEY

Patented Apr. 4, 1944

2,345,922

UNITED STATES PATENT OFFICE 2,345,922

VARIABLE SERIES CAPACITOR FOR STABILITY

Robert D. Evans, Swissvale, and Alexander C. Monteith, Wilkinsburg, Pa., assignors to Westinghouse Electric & Manufacturing Company, East Pittsburgh, Pa., a corporation of Pennsylvania Application June 6, 1942, Serial No. 446,078

22 Claims. (Cl. 172—237)

Our invention relates to synchronous transmission-systems of such length and high voltage that stability is a problem in their operation, and our invention has particular relation to the utilization of series capacitors for improving the stability of such system, or increasing the amount of power which may safely be transmitted thereover. More specifically yet, our invention relates to a method and means for so controlling the series capacitors, or the amount of series capacitor which is connected in each line-circuit, that stability is enhanced during switching-operations which are necessary to clear a fault from the transmission-system, particularly, but not necessarily, in the case of transmission-systems utilizing two or more parallel line-circuits.

In our companion application, Serial No. 445,562, filed June 3, 1942, we have explained the advantage of series capacitors, and an economically practicable, and eminently advantageous, instrumentality for making it possible to transmit more power over a system, maintaining stability through faults, by the use of limited-voltage, series-capacitors protected by special protective-equipment which not only quickly by-passes the capacitors during moments of excessive current-flow while faults are being cleared, but also quickly restores the capacitors into service, after the clearing of the fault condition, within a time which is sufficiently short to make the series capacitors available to prevent loss of synchronism during the critical moments immediately following a fault-clearing switching-operation.

The voltage-ratings of such capacitors are limited by the normal full-load line-current traversing a capacitor of a predetermined required impedance. This is very important, from an economical standpoint, because, if the capacitors were built with a level of insulation sufficiently high to enable the capacitors to withstand the flow of currents of fault-magnitude, the cost would go up in accordance with something like the second power of the voltage-drop or current, which would, in general, make the series-capacitor installation economically unjustifiable in comparison with the cost of building an additional transmission-line circuit, particularly if additional losses are capitalized. The use of the quickly-clearing protective-gap apparatus, in combination with a series capacitor for a stability-limited transmission-line, has changed the economic picture by making series capacitors an economically feasible and money-saving means for obtaining more power-transmitting capacity out of a given transmission-line, in lieu of building more transmission-circuits for carrying the additional power.

Our present invention, while theoretically not limited to quick-restoring protective-apparatus for the series capacitors, nevertheless seems, at present, to have its practical commercial form of embodiment in the type of system utilizing such protective apparatus.

Our present invention has particular relation to the usual type of multiple-circuit transmission-system, in which the faults will have a sufficiently low resistance so that the electrical output of the generator or generators decreases materially during the fault-condition. In such systems, the initial power-angle of the system is important, referring to the phase-angle between the internal voltages of the synchronous machines at the generator and receiving ends, respectively. The power which is transmitted during the fault-condition is dependent upon the initial power-angle of the system, existing at the moment when the fault first occurs, and the smaller this angle is, the smaller will be the amount of power which will thereafter be transmitted during the continuance of the fault, before the fault is cleared, and thus the greater will be the acceleration of the generators, which are being driven by prime-movers adjusted to deliver the amount of power which was being transmitted over the line just prior to the occurrence of the fault. On the other hand, it is important to note the amount of power which can be transmitted over the system after the faulty line-circuit has been removed from operation, leaving the line to transmit the power over the remaining circuit or circuits. Under such conditions, it is important, after the switching-operation, to have series capacitors present, or to have more series capacitors present than before the switching-out of the faulty line-section or sections.

In accordance with our present invention, series capacitors are introduced in the line in response to fault-conditions, or in response to the resultant circuit-interrupting operation, for the purpose of bringing the power-transmitting angle of the line, subsequent to the fault, closer to the initial angle which existed prior to the incipience of the fault-condition, or making these two angles approximately equal to each other, although exact equality is not by any means requisite, and sometimes possibly not even desirable, depending upon the particular system-conditions. The added series capacitors may either be added to a line which previously had no series capacitors in it, or they may be additional capacitors which are added to a line which already had some series capacity in it prior to the fault-clearing switching-operation.

In general, our present invention relates to means and methods for introducing series-capacitance in a synchronous transmission system, in response to any circuit-change which would increase the reactance of the circuit, such circuit-change including the removing of one of a plurality of several parallel-connected generators from the system, as well as removing (or switching out) one of a plurality of parallel-connected line-sections. Our system and apparatus seem at present to be more important in connection with circuit-changes involving the switching-out of faulty line-sections, rather than generator-switching operations, as the reactance of a generator is generally less than that of a line-section, and ordinarily a generator is not removed from the system, anyway, except under relatively light-load conditions, in which there is no particular stability-problem, anyway. However, we desire our invention to be understood as comprising a response to any reactance-increasing circuit-change, whether produced by the intentional or accidental removal of a generator, or by a line-sectionalizing switching-operation.

Our invention also contemplates the quick introduction of series capacitors, in response to a fault-condition involving one or two of the three line-conductors of a three-phase transmission-system leaving the capacitor-protective equipment to immediately short out the added capacitors in the line-conductors carrying currents of fault-magnitude, but also effectively introducing, in the unfaulted line-conductor or conductors, a series capacitance which is of material aid in increasing the amount of power transmitted by the line, and hence the load on the generators, during the fault-condition, thus decreasing the overspeeding of the generators.

In all types of application of our present invention, the speed of clearing faults is of very great importance, as the amount of speed-change of the generator during the fault-condition is dependent upon the duration of the fault-condition, so that our invention, in all of the aspects, relates to transmission-systems which are protected, against faults, by high-speed fault-clearing protective-apparatus. This high-speed fault-clearing protective-apparatus may involve either gang-operated breakers, or single-pole breakers which are utilized in connection with a reclosing-means or system for promptly reclosing the breaker in the event of faults which clear themselves upon the removal of power from the faulty phase-conductor or conductors.

Figure 2:
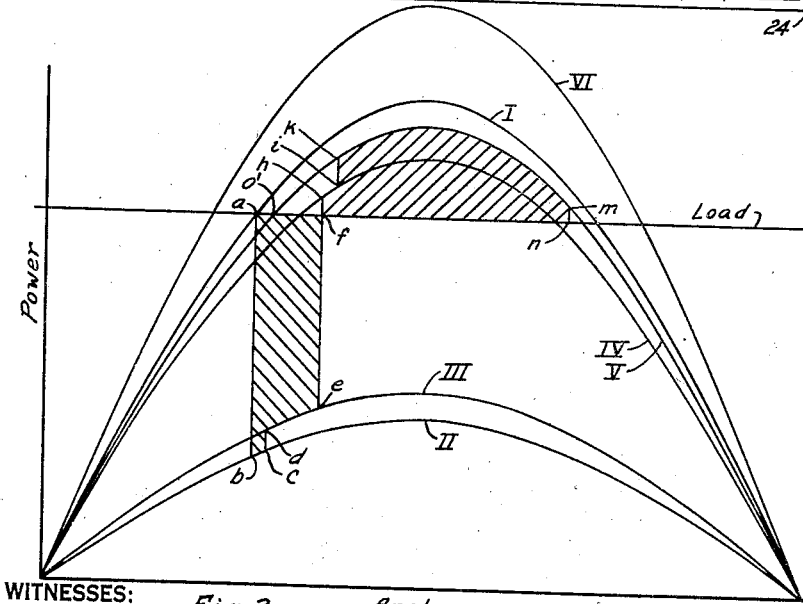

With the foregoing and other objects in view, our invention consists in the apparatus, combinations, systems, methods and parts, hereinafter described and claimed, and illustrated in the accompanying drawing, wherein:

Figure 1 is a diagrammatic view of circuits and apparatus illustrating the essential principles of our invention in a somewhat diagrammatic form; and Fig. 2 is a curve-diagram which will be referred to in the explanation of the invention.

In Figure 1, we have illustrated our invention as being applied to a three-phase, 60-cycle, high-voltage, synchronous, two-circuit transmission-system, feeding power from one or more hydroelectric generators or synchronous sources $S1$, $S2$, to a relatively infinite receiver-bus RB, through four three-phase line-sections L1, L2, L3 and L4, which are bussed together through four three-phase buses B1, B2, B3 and RB. Each line-section is connected to its bus by suitable circuit-interrupting means, which are illustrated as single-pole or single-phase breakers, BA, BB and BC, one for each phase, said breakers being controlled, in each case, by suitable relaying-apparatus R. As these equipments may all be similar, only one is shown in any detail. The two intermediate buses B2 and B3 have their respective phase-conductors A, B, C, joined by the series-capacitor equipment which is illustrated as comprising two serially-connected series capacitors C1 and C2, each provided with its protective-gap-equipment G1, G2, respectively, including a gap-breaker GB1 and GB2, respectively. The series-capacitor equipment is single-phase, one such equipment for each of the three line-phases A, B and C, and as all three equipments are similar, only one is shown in any detail.

Each line-sectionalizing circuit-breaker, such as the detailed, phase-C breaker BC between the line-section L4 and the bus B3, is a circuit-breaker having main contacts 10, one or more auxiliary breaker-switches 11 for relay-circuit controls of various natures, a closing-coil 12, and an opening-mechanism comprising a latching-device 13 and a trip-coil 14.

Each of the relaying-equipments R consists of a current- and voltage-energized panel including tripping-contacts TA, TB and TC, one for each phase, and closing-contacts CA, CB and CC, one for each phase, these contacts being suitably controlled, either for single-pole tripping or multiple-pole tripping involving either two or three poles of the circuit breakers BA, BB and BC at each relaying point. The relaying-apparatus R also includes one or more fault-detector contacts FD, only one such contact being shown, which is intended to represent any suitable relay-contact-means for sensitively detecting, or responding quickly to, any kind of fault, on any one or more phases, regardless of the direction of the fault-current, whereas the tripping-contacts TA, TB, TC are directionally controlled. The relaying-apparatus R usually also includes a carrier-current transmitter and receiver, which is suitably coupled to the protected line-section, as shown at 3, for the purpose of enabling the relay to discriminate according to the fault-conditions at the other end of the protected line-section.

The series-capacitor equipment for each phase includes the two serially connected capacitor-equipments C1 and C2, in each phase of the transmission-line. Each of the series capacitors C1 and C2 is provided with its own protective-gap-equipment G1 and G2, respectively, and as these protective-gap-equipments are identical, a description of one will suffice for both.

The protective-gap-equipment G1, in its barest essentials, in the form illustrated, consists of two spaced main-gap electrodes 4 and 5, which are connected in a shunt-circuit 6 across the terminals of the series capacitor C1 which it is protecting. Arcing is initiated across the gap-space between the main-gap electrodes by means of a known trigger-gap mechanism 7, and the arcing of the main-gap electrodes 4—5 is interrupted by any suitable means, as by an air-blast from a nozzle 8, from a compressed-air tank 9, under the control of a solenoid-operated valve 11 which is illustrated, by way of example, as being energized from an auxiliary current-transformer 12 in the gap-circuit 6, the time of operation of the valve 12 being sufficiently sluggish so that the protective relaying and sectionalizing equipment R and BA, BB and BC in the faulted line-section, can be operated to effect a sectionalizing-operation prior to the effective application of the air-blast to the gap 4—5. This particular protective-gap device is more completely described, and is claimed in an application of Ludwig and Fields, Serial No. 437,636, filed April 4, 1942, assigned to the Westinghouse Electric & Manufacturing Company.

Each protective-gap-equipment, such as G1, is also provided with a gap-breaker, such as GB1, including main breaker-contacts 14 which are connected in parallel to both the series capacitor C1 and the main gap-device 4—5. The gap-breaker, such as GB1, is also illustrated as comprising a closing coil 15, and an opening-mechanism including a latch 16, a trip-coil 17, and an auxiliary breaker switch 14a.

In accordance with our present invention, means are provided for controlling the amount of series-capacitance which is connected in the transmission-system, in accordance with changing system-conditions, in such manner as to increase the ability of the system to ride through faults, without loss of synchronism. The most important embodiment of this general idea is in connection with switching-operations such as are necessary to disconnect a faulted line-section, or a faulted phase-conductor or conductors of a line-section, from the system; and we have shown means for thus controlling the controlled series capacitor C1, in all three phases, in accordance with the relaying-operations and switching-operations of all of the line-sections, L1, L2, L3 and L4, which are connected to the two buses B2 and B3 between which the capacitor C1 is connected. The capacitor-controlling means might be applied to both of the serially connected capacitors C1 and C2, in each phase, as well as to just one of said capacitors; however, to illustrate the general case in which a certain amount of capacitance is serially connected in the line before this switching-operation, and a different amount of capacitance is connected in the line after the switching-operation, we have indicated the uncontrolled C2 capacitors as being unaffected by our special control-mechanism.

Each of the line-sectionalizing breakers BA, BB and BC, as shown more particularly for the breakers at the intermediate substation, is provided with an extra auxiliary back-contact switch 20 and an extra auxiliary front-contact switch 21, the auxiliary breaker-switch 20 being closed when the breaker is open, and the auxiliary breaker-switch 21 being open when the breaker is open. We utilize these two auxiliary breaker-switches 20 and 21, as well as the fault-detector relay-contacts FD, for all of the line-section terminals which enter or leave the intermediate substation comprising the two buses B2 and B3, for simultaneously controlling all three of the gap-breakers GB1 which are associated with one of the series capacitors C1, in each of the line-phases A, B and C.

In the illustrative transmission-system shown in the drawing, it is assumed that, initially, only one of the series capacitors, namely the capacitor C2, is connected in circuit with each phase of the line. It is contemplated that the line will be normally operated with the other series capacitor, C1, short-circuited by its short-circuiting breaker GB1, although, in the drawing, all switches and relays are shown in their deenergized position, as if the transmission-system were not energized at all. It will be understood, however, that the three series-capacitor breakers GB1, in the three line-phases A, B, and C, are normally closed.

We have shown our capacitor-controlling system as comprising a common tripping-bus 22, to which all three of the trip-coils 17 are connected, for tripping the three series-capacitor breakers GB1. The tripping-bus 22 is energized in response to the closure of any one of the fault-detector contacts FD of the four relaying-equipments R which are connected to the ends of the four line-sections L1, L2, L3 and L4 at the substation containing the two intermediate buses B2 and B3. These four relay-contacts FD are connected in parallel, between the positive terminal (+) and the tripping-bus 22, so that a tripping-circuit is completed from said tripping-bus 22, through each of the three trip-coils 17, and its associated breaker-switch 14a, to the negative terminal (—).

The tripping-bus 22 is also energized, in response to the opening of any one of the twelve line-sectionalizing breakers BA, BB and BC, in any of the phases of any of the four line-sections which are connected to the buses B2 and B3. Thus the twelve auxiliary breaker-switches 20, which are closed when their respective breakers BA, BB or BC are opened, are shown connected between the positive terminal (+) and the tripping-bus 22.

We also provide a closing-bus 23, to which are connected all three of the closing-coils 15 of the series-capacitor breakers GB1, in each of the line-phases A, B and C. This closing-bus 23 is illustrated as being energizable from a relay-contact 24 of a slowly acting auxiliary relay 25, having an operating-coil and some time-delay means which is symbolized by a dashpot 26. This closing-relay 25 is energized only upon the closure of all twelve of the line-sectionalizing breakers BA, BB and BC which are connected to the intermediate buses B2 and B3. The closing-coil energizing-circuit may be traced, from the auxiliary make-contact switch 21 of the BC breaker which is connected between the line L2 and the bus B2, from which the circuit commences at the positive bus, and thence continues through the corresponding breaker-switches 21 of the other two breakers BB and BA which are connected between the other two phases of said line L2 and the bus B2, and thence, in succession, through the corresponding switches 21 for all of the other line-sectionalizing breakers which are connected to the two buses B2 and B3, and finally to the operating-coil of the closing-relay 25, thus closing the closing-circuit contact 24, after a time-delay which is controlled by the dashpot 26 or other equivalent means.

The dashpot 26 provides a delay, which may be of the order of six cycles, or other suitable time, according to the nature of the particular transmission-system, said time being chosen so that, if the last line-sectionalizing breaker to close closes in on a faulty line-section, or on a faulty phase-conductor of a line-section, so that said breaker immediately reopens, there will be time for this reopening breaker-operation to occur before the closing-circuit contact 24 is closed. In this manner, we avoid an unnecessary closing-operation of the three series-capacitors GB1, in cases where the reclosure of a line-sectionalizing breaker is followed immediately by a reopening operation thereof.

We also show remote-control means for controlling the opening and closing operations of the capacitor-breakers GB1. This remote-control means is symbolized by control-apparatus at the generator-station, containing the synchronous generators S1, S2, and the generator-bus B1. The control-apparatus just mentioned may be either automatic in its nature, or it may be manual, under the control of the station-operator. For simplicity of illustration, we have illustrated this control in the form of two control-switch contacts 32 and 33, which are illustrated as push-button contacts, although they are intended to be symbolic of any suitable controlling-contacts at the generator-station. Two pilot-channels 34 and 35 are utilized to operatively connect the control-contacts 32 and 33 to two receiver-relays 36 and 37, respectively, which are located at the intermediate substation where the three capacitor-breakers GB1 are located. These pilot-circuits 34 and 35, while illustrated, for simplicity, as pilot-wires, may be any of the known forms of communicating-channels which are utilized for remote-control between one end of a transmission-line and another. The receiver-relays 36 and 37 have contacts 38 and 39 which are utilized, respectively, to energize the tripping-bus 22 and the closing-bus 23 of the three series-capacitor breakers GB1.

Fig. 2 illustrates the operation of our invention under typical operating-conditions, in which the transmission line is carrying a load, as indicated, which is close to the maximum value which can be carried without loss of synchronism upon the occurrence of a fault of a predetermined nature, which it is desired that the system shall be able to ride through, without loss of synchronism. It is commonly desired for the system to be able to withstand a double line-to-ground fault without loss of synchronism, but whatever the nature of this fault is, the corresponding power-angle curves should be drawn, for the various system-conditions, in order to make an analysis of the stability-problem, in a manner which will now be explained in connection with Fig. 2.

In Fig. 2, we have shown six curves representing the power which may be transmitted from the sending bus B1 to the receiver-bus RB, at different phase-angles of the transmission-system illustrated in Fig. 1, under different system-operating conditions such as are encountered in clearing a fault and automatically controlling the amount of series capacitance in the line, in accordance with our invention. In plotting these curves, the line-resistance has been neglected, and it has been assumed that the receiver-bus RB is an infinite bus, having a voltage and a phase-angle which remain fixed during the transients accompanying the fault and the resultant switching and controlling operations, but the slight errors introduced by these assumptions may readily be allowed for, in a manner which is well known in the art. In Fig. 2, the six curves are for the following system-conditions:

*Curve I.*—No fault, all lines in circuit, one series capacitor in each phase.

*Curve II.*—During the fault, all lines in circuit, one series capacitor in the unfaulted phase.

*Curve III.*—During the fault, all lines in circuit, both series capacitors in the unfaulted phase.

*Curve IV.*—After clearing the fault, at least the faulted phases of one line-section out, both series capacitors in the unfaulted phase.

*Curve V.*—After clearing the fault, at least the faulted phases of one line-section out, both series capacitors in each phase.

*Curve VI.*—After reclosing the line-breakers, all lines in circuit, both series capacitors in each phase.

Initially, it is assumed that all four of the line-sections L1, L2, L3, L4, are in circuit, and that only the series capacitor C2 is in series with each of the line-phases, at the intermediate switching-station containing the buses B2 and B3. It is assumed that power is being transmitted over the system, from the bus B1 to the bus RB, in an amount, and at a phase-angle, represented by the coordinate of the point $a$ on the Curve I.

If, now a fault occurs somewhere on the transmission system, the amount of power which is transmissible over the transmission-line at any given phase-angle will, in general, be changed. The faults may be of different types, such as single line-to-ground, double line-to-ground, phase-to-phase, or three-phase, and these different types of fault will be of different degrees of severity, so far as system-stability is concerned. The severity of the fault, from the standpoint of its deleterious effect on system-stability, will also depend upon the fault-location. The system is analyzed for the type and location of fault which it is to be required to ride through, without loss of synchronism. If that fault is a low-resistance fault, as is the case in most of the important high-voltage transmission-lines where stability is a problem, there will, in general, be a reduction in the amount of power which is transmitted by the line, at any given angle, during the existence of the fault, and hence the transmitted power drops, along the line $a$—$b$, in Fig. 2, from the Curve I to the Curve II, upon the occurrence of the fault.

The Curve II represents an operating-condition in which the series capacitor C2, which was originally in series with each phase of the line, is short-circuited out of service in the faulted phase or phases, by the operation of its protective gap G2, which protects these capacitors against the overvoltages which would be produced therein by the line-currents of fault-magnitude in the faulted line-conductor or conductors; so that the series capacitor C2 remains in circuit in only the unfaulted phase or phases of the line.

Since the generators S1 and S2 continue, for a while to be driven with approximately an unaltered amount of mechanical driving-power, the difference between the amount of electrical load $b$ on the generators and the amount of mechanical input-power $a$ of the generators will produce an accelerating-force on the generators, proportionate to the length of the line $a$—$b$. The generators will thus begin to accelerate, and to increase the phase-angle by which the internal generator-voltage leads the receiver-voltage at the bus RB. During this acceleration of the generator, therefore, the line-angle is increasing, and under the fault-condition represented by the Curve II, the transmitted electrical power changes in accordance with line $b$—$c$.

Within about a cycle after the fault occurs, or at any other convenient operating-time, it is assumed that the three capacitor-shunting breakers GB1 of the previously short-circuited capacitors C1 are opened, thus inserting the C1 capacitors in series with the respective line-phases, but the capacitor-protecting gaps G1 will immediately break down in each of the line-phases in which current of fault-magnitude appears, so that the additional capacitor C1 will be inserted in only the unfaulted line-conductor or conductors. This additional series capacitor, in the unfaulted phase or phases, will produce a slight increase in the amount of electrical power which is transmitted over the system, as represented by the line c—d from the Curve II to the Curve III.

The line-angle continues to increase, with the power now being transmitted in accordance with the Curve III, until the operation of one or more of the line-sectionalizing breakers BA, BB or BC, disconnecting the faulted line-section, or the faulted phase-conductors of the faulted line-section. This point is represented by the line e—f—h, representing the transfer of the system power-angle from the Curve III to the Curve IV. It is assumed, in the particular case illustrated in Fig. 2, that the point h at which the system transfers to the Curve IV is above the horizontal line representing the mechanical power-input into the generators. The line e—h crosses the load-line, or generator-input line, at the point f, so that the total amount of acceleration of the generators S1 and S2 (Fig. 1) is proportionate to the shaded area a—b—c—d—e—f in Fig. 2.

At the operating-point h on Curve IV, the electrical load on the generators, as indicated by the point h, is in excess of the mechanical power-input into the generators, as represented by the point f so that the generators will now begin to decelerate; but in the time-interval between the points a and h, the generators will have accelerated to a velocity which is very slightly in excess of the velocity corresponding to their original frequency, which is assumed to be 60 cycles; and since the receiver-bus RB is assumed to be infinite, the frequency of the receiver-bus is assumed to remain constant at 60 cycles during the transient. The synchronous machines S1 and S2 at the generator-end are, therefore, operating at a speed slightly in excess of the synchronous machines which are connected to the system at or beyond the receiver-bus RB, and the inertia of the generators S1 and S2, with their prime-movers (not shown), causes said generators to continue to run faster than the synchronous machines at the receiver-end, until these generators can be adequately retarded by a decelerating force such as the force f—h.

The phase-angle of the system continues to increase, therefore, as the system operates in accordance with the power indicated by the Curve IV, until a point i is reached, at which it is assumed that the air-blasts are applied to the protective-gaps G1 and G2 which had been arcing, thus extinguishing the arcs in these gaps and restoring both of the series capacitors C1 and C2 into service, in the previously faulted phase or phases of the line. The line-operating conditions thereupon change, along the line i—k, from the Curve IV to the Curve V.

While we have assumed the existence of a protective gap G1 or G2 of a type in which some external means is necessary, such as the air-blast, for extinguishing the arc when the value of the line-current again approaches the full-load value after the initiation of the arcing-condition of the gap, and while we have assumed a certain time h—i before the extinction of the gap-arc after the reduction of the line-current from its fault-magnitude to its full-load value as indicated by the load-current in Fig. 2, we wish it to be understood that our invention is also applicable to those types of capacitor-protecting systems which utilize self-clearing gaps, in which case the gap-arc would automatically extinguish itself when the line-current reduced to its full-load value, so that the time-interval h—i might be practically nonexistent; in which case, the line i—k would be practically a continuation of the line e—h. In any event, the Curve IV represents only a brief or temporary operating-condition of the line.

The system is now operating in accordance with the power-angle conditions depicted in the Curve V, and the speed of the generators S1 and S2 continues to decrease until the point m is reached, at which the area of the shaded area f—h—i—k—m—n above the load-line is equal to the area of the shaded area a—b—c—d—e—f below the load-line, at which point the speed of the generators will have returned to normal. If this return to normal-speed occurs at a point m which is above the load-line, as represented by the length of the line m—n, the system will not lose stability on this particular power-swing.

It will be noted, however, that, at the operating-point m, the transmitted electrical power m is still in excess of the mechanical input n into the generator, so that the prime-movers and the generators S1 and S2 are still decelerating. The phase-angle of the line thereupon decreases, while the electrical power is being transmitted in accordance with Curve V, along the line m—k—o, until the intersection-point o between the Curve V and the load-line. The system thereupon oscillates or hunts about this point o until a steady-state condition is reached, these oscillations usually requiring several cycles of oscillations, requiring something like a second, more or less, for each cycle of oscillation or hunting.

It is important to note that the final operating-Curve V, after the line-sectionalizing operation to clear the fault, is practically coincident with the initial power-angle Curve I, notwithstanding the fact that the circuit-conditions have been altered by the removal of the faulty line-section, or by the removal of the faulty phase-conductors of the line-section in which the fault occurs. If the series capacitors C1 had not been added to the system, in accordance with our invention, then the system, after the switching-operation, would have had a very much higher line-reactance than before, so that the final operating-Curve V would have been very much lower than the initial operating-Curve I, and it will readily be seen, from Fig. 2, that there would not have been sufficient decelerating area (corresponding to f—h—i—k—m—n) to maintain synchronism. However, because of our introduction of the additional series-capacitor C1 in each phase, we have substantially compensated for the added line-reactance which was caused by the line-switching operation, so that the final, steady-state operating-point or angle o is approximately coincident with the initial operating-point or angle a, and the disturbance on the system is very much reduced or minimized.

While we have illustrated the addition series capacitance as being introduced very promptly, at the time c—d, it is, of course, possible that more time might have been taken to get the additional series capacitors C1 into service, such, for example, as the time i—k, in which case, Curve III would have been eliminated, and Curve IV would have been slightly reduced in magnitude for the small time h—i during which it is in operation.

In systems having reclosing-breakers, which is always so in case of single-pole breaker-operation, as illustrated, there will be a certain operating-time at which the line-sectionalizing breakers which had opened, to clear the fault, will reclose again, and if the fault is of a type which will clear itself, or remove itself from the line, upon the deenergization of the faulty line-section or line-conductor, it will, in general, be possible to leave the breaker reclosed after the first reclosing operation. After the expiration of this breaker-reclosing time, the system will change from the power-angle conditions represented by the Curve V to the Curve VI, the exact point of transfer, whether before or after the time represented by the point $m$, being not indicated in Fig. 2, because the conditions may vary in different systems. It is believed that the nature of the operation will be readily understood, however, in view of the explanations already given.

As a final step in the operation of our system, whether or not the transfer to the Curve VI is immediate, as in the case of a reclosing-breaker system, or at some future time, as a result of a manual breaker-controlling operation, which would be subsequent to the subsidence of the hunting-transient about the operating-point $o$ in Fig. 2, the opened line-sectionalizing breakers will be eventually closed, thus transferring the system momentarily from the operating-conditions represented by the Curve V to those represented by the Curve VI, and shortly thereafter, in a time represented by the setting of the dashpot 26 of Fig. 1, the capacitor-shunting breakers GB1 will be closed, thus short-circuiting the C1 capacitors out of service, and restoring the line to its initial operating-conditions represented by the Curve I.

While we have specifically illustrated and described our invention in connection with a system having low-resistance faults, such as produce an acceleration of the sending-end generators during the continuance of the fault-condition, it is obvious that the general principles of our invention are applicable, also, in the less usual type of transmission-system in which the critical, or stability-jeopardizing, faults have a resistance which is sufficiently high to cause a deceleration of the sending-end generators during the fault-condition, in which case the control of the amount of series-capacitance, connected in the line, should be in the direction of decreasing the amount of series capacitance, in response to the fault-condition or the sectionalizing breaker-operation, rather than increasing the amount of series capacitance as in the particular situation which we have just described.

It is also to be understood that the amount of series capacitance may be changed in accordance with, or to compensate, any change in the operating-conditions of the circuit which would increase or decrease the amount of effective inductive reactance of the circuit, such as removing or adding a generator from or to the system, as well as changing the number of line-sections.

We desire our generator-end control-means 32 and 33 to be regarded as symbolic of any means for bringing about a capacitor-control, in conformity with such generator-end changes as affect the amount of effective line-reactance between the internal machine-voltage of the synchronous machines at the generator-end and the internal machine-voltage of the synchronous machines of the receiver-end of the line. Since a line-section, in general, has a greater reactance than a generator, in the usual case, a line-switching operation has a greater effect upon the total line-reactance, than a generator-switching operation; so that, in general, it is more important to control the amount of series-capacitance in accordance with line switching operations than in accordance with generator-switching operations. We desire it to be understood, however, that the same principles apply, although usually in a lesser degree, in the case of generator-switching operations, as in the illustrated case of line-switching operations.

Furthermore, while we have illustrated our invention in connection with the use of series capacitors of a limited voltage, we wish it to be understood that our invention, at least in its broadest aspects, is applicable to any sort of series-capacitor installation, regardless of the voltage-rating of the capacitor, and regardless of any means which may be adopted for limiting the possible amount of voltage appearing across the capacitor. The rated voltage of a limited-voltage series-capacitor is limited in accordance with the full-load line-current, so that it is quite necessary to utilize capacitor-protective equipment for not only very quickly short-circuiting the capacitor as soon as the line-current rises to values in excess of the rated current of the capacitor, which is the full-load current of the line, but have also very quickly restored the capacitor to service after the subsidence of the line-current, the capacitor-restoration being quite essential in any system where transient-stability limits are involved, as in the phase-angle swings produced by a fault-condition or a fault-clearing switching-operation.

In any series-capacitor installation, it seems to be a practical necessity to provide capacitor-shunting breakers, such as the breakers GB1 or GB2, so that it will be possible to switch the capacitors in and out of the line, for necessary service-operations; and our invention makes use of these capacitor-shunting breakers to effect a capacitor-varying change which is beneficial to the transient stability of the line, or the ability of the transmission-system to ride through disturbances without loss of synchronism.

It will be noted that the effect of a line-switching operation (such, for example, as cutting the line-section L4 out of the transmission-system because of a fault existing on said line-section), is to increase the total effective inductive reactance of the line, effective between the internal voltages of the synchronous machines on the bus B1, as compared to the internal voltages of the synchronous machines on the bus RB, and the effect of this increased line-reactance, or line-inductance, is to reduce the power-limits of the line, or to reduce the height or amplitude of the power-angle curve such as those shown in Fig. 2. In accordance with our invention, we thereupon insert series capacitance into the line; if any series capacitance was already in the line, we insert more; if no series capacitance was previously included in the line, we insert a series capacitor into the line, as a result of the switching-operation which increased the line-reactance and reduced the amplitude of the power-angle curve. By this means, we are able to restore, or to approximately restore, the effective value of the inductive line-reactance to somewhere near the value which it had before the faulted line-section had been switched out of service.

Thus, referring to the curves in Fig. 2, it will be noted that the final operating-condition of a transmission-system in which one line-section has been switched out, as depicted by the Curve V in Fig. 2, has its amplitude approximately the same as the Curve I for the initial operating-condition with all of the line-sections in service, but without the additional series capacitor C1 which is added after the occurrence of the fault-condition. This brings the final operating-angle $o$ approximately coincident with the initial operating-angle $a$, or preferably the final operating-angle $o$ should be a little larger than the initial operating-angle $a$, as shown, although the final angle could be the smaller, and in any event the two angles should be approximately the same. If the series capacitor C1 had not been added to the line, when one of the line-sections was cut out of service, then the amplitude of the final power-angle Curve V would have been very much lower than the amplitude of the initial operating-Curve I, so that the available decelerating area, such as $f$—$h$—$i$—$k$—$m$—$n$ would have been very much smaller, and the stability-maintaining ability of the line would have been very much smaller, which means that the line could not have ridden through such a disturbance, when carrying such a load, as was depicted in Fig. 2.

While we have thus illustrated and explained our invention in connection with a particular system and form of embodiment, we wish it to be understood that the general principles of our invention are subject to a considerable latitude or variation in adapting the invention to specific service-requirements, and in specific details of construction and operation. We desire, therefore, that the appended claims shall be accorded the broadest construction consistent with their language.

We claim as our invention:

1. A synchronous transmission-system having a plurality of line-conductors, a station including a plurality of line-sectionalizing breakers and a plurality of controlled series-capacitor elements, one of the aforesaid series-capacitor elements being in series-circuit relation to each phase of the line-conductors, a capacitor-shunting breaker associated with each of the aforesaid series-capacitor elements, and means responsive to operations of the aforesaid line-sectionalizing breakers for effecting operations of the aforesaid capacitor-shunting breakers.

2. A multi-circuit polyphase transmission-system including a series-capacitor station having a pair of polyphase buses, a plurality of controlled series-capacitor elements, one for each phase of the transmission-system, connected between the corresponding phases of the two buses, a plurality of line-sectionalizing breakers for connecting the ends of a plurality of line-sections to at least one of the aforesaid buses, a capacitor-shunting breaker associated with each of the aforesaid series-capacitor elements, and means responsive to an opening-operation of any of the aforesaid line-sectionalizing breakers for effecting an opening-operation of all of the aforesaid capacitor-shunting breakers.

3. A multi-circuit polyphase transmission-system including a series-capacitor station having a pair of polyphase buses, a plurality of controlled series-capacitor elements, one for each phase of the transmission-system, connected between the corresponding phases of the two buses, a plurality of line-sectionalizing breakers for connecting the ends of a plurality of line-sections to at least one of the aforesaid buses, a capacitor-shunting breaker associated with each of the aforesaid series-capacitor elements, means responsive to an opening-operation of any of the aforesaid line-sectionalizing breakers for effecting an opening-operation of all of the aforesaid capacitor-shunting breakers, and means responsive to a closing-operation of the last one of a plurality of line-sectionalizing breakers for effecting a closing-operation of all of the aforesaid capacitor-shunting breakers.

4. A synchronous transmission-system having a plurality of line-conductors, a station including a plurality of line-sectionalizing breakers and a plurality of controlled series-capacitor elements, one of the aforesaid series-capacitor elements being in series-circuit relation to each phase of the line-conductors, a capacitor-shunting breaker associated with each of the aforesaid series-capacitor elements, means responsive to a closed condition of all of the aforesaid line-sectionalizing breakers for causing all of the aforesaid capacitor-shunting breakers to be closed, and means operative in response to a predetermined fault-condition on the transmission-system for effecting an opening-operation of all of the aforesaid capacitor-shunting breakers.

5. A multi-circuit polyphase transmission-system including a series-capacitor station having a pair of polyphase buses, a plurality of controlled series-capacitor elements, one for each phase of the transmission-system, connected between the corresponding phases of the two buses, a plurality of line-sectionalizing breakers for connecting the ends of a plurality of line-sections to at least one of the aforesaid buses, a capacitor-shunting breaker associated with each of the aforesaid series-capacitor elements, and fault-detector means associated with said transmission-system for effecting an opening-operation of all of the aforesaid capacitor-shunting breakers.

6. A multi-circuit polyphase transmission-system including a series-capacitor station having a pair of polyphase buses, a plurality of controlled series-capacitor elements, one for each phase of the transmission-system, connected between the corresponding phases of the two buses, a plurality of line-sectionalizing breakers for connecting the ends of a plurality of line-sections to at least one of the aforesaid buses, a capacitor-shunting breaker associated with each of the aforesaid series-capacitor elements, fault-detector means associated with said transmission-system for effecting an opening-operation of all of the aforesaid capacitor-shunting breakers, and time-delay means responsive within a predetermined time-interval to a closing operation of the last one of a plurality of line-sectionalizing breakers for effecting a closing-operation of all of the aforesaid capacitor-shunting breakers.

7. A synchronous transmission-system including a plurality of normally closed line-sectionalizing breakers, a plurality of series-capacitor elements, one for each phase of the transmission-system, capacitance-changing means associated with each of said series-capacitor elements, and fault-responsive means, responsive to predetermined fault-conditions on the transmission system, for effecting opening-operations of appropriate line-sectionalizing breakers and for effecting such operation of said capacitance-changing means as to reduce the system-oscillations about the final operating power-angle of the transmission-system after the line-sectionalizing switching-operation.

8. A synchronous transmission-system including a plurality of normally closed line-sectionalizing breakers, a plurality of controlled series-capacitor elements, one for each phase of the transmission-system, a plurality of normally closed capacitor-shunting breakers, one for each of the aforesaid series-capacitor elements, and fault-responsive means, responsive to predetermined fault-conditions on the transmission system, for effecting opening-operations of appropriate line-sectionalizing breakers and for effecting opening-operations of all of the aforesaid capacitor-shunting breakers, the aforesaid controlled series-capacitor elements having such capacitance that the power-angle operating-condition of the transmission-system after said breaker-opening operations approximates the power-angle operating-condition of the transmission-system before the fault.

9. A synchronous transmission-system subject to circuit-changes such as would increase the amount of effective line-reactance of the circuit, in combination with means for inserting series-capacitance in the system approximately simultaneously with such a circuit-change.

10. A synchronous transmission system having series-capacitance in the system and subject to circuit-changes such as would increase the amount of effective line-reactance of the circuit, in combination with means for increasing the amount of series-capacitance in the system approximately simultaneously with such a circuit-change.

11. The method of operating a synchronous transmission-system, which comprises the steps of effecting a circuit-change such as would increase the amount of effective line-reactance of the system, and approximately simultaneously inserting series-capacitance in the system.

12. The invention as defined in claim 1, characterized by the aforesaid series-capacitor elements being of limited voltage-rating, approximating full-load line-current conditions, in combination with capacitor-protective means associated with each of the aforesaid series-capacitor elements, for protecting the series-capacitor elements against excessive voltages thereacross, and for quickly removing said protection upon the subsidence of the excessive line-current conditions, said protection-removal being sufficiently quick to enable the capacitor, when in service, to assist in maintaining stability.

13. The invention as defined in claim 2, characterized by the aforesaid series-capacitor elements being of limited voltage-rating, approximating full-load line-current conditions, in combination with capacitor-protective means, associated with each of the aforesaid series-capacitor elements, for protecting the series-capacitor elements against excessive voltages thereacross, and for quickly removing said protection upon the subsidence of the excessive line-current conditions.

14. The invention as defined in claim 3, characterized by the aforesaid series-capacitor elements being of limited voltage-rating, approximating full-load line-current conditions, in combination with capacitor-protetcive means, associated with each of the aforesaid series-capacitor elements, for protecting the series-capacitor elements against excessive voltages thereacross, and for quickly removing said protection upon the subsidence of the excessive line-current conditions.

15. The invention as defined in claim 4, characterized by the aforesaid series-capacitor elements being of limited voltage-rating, approximating full-load line-current conditions, in combination with capacitor-protective means, associated with each of the aforesaid series-capacitor elements, for protecting the series-capacitor elements against excessive voltages thereacross, and for quickly removing said protection upon the subsidence of the excessive line-current conditions, said protection-removal being sufficiently quick to enable the capacitor, when in service, to assist in maintaining stability.

16. The invention as defined in claim 5, characterized by the aforesaid series-capacitor elements being of limited voltage-rating, approximating full-load line-current conditions, in combination with capacitor-protective means, associated with each of the aforesaid series-capacitor elements, for protecting the series-capacitor elements against excessive voltages thereacross, and for quickly removing said protection upon the subsidence of the excessive line-current conditions.

17. The invention as defined in claim 6, characterized by the aforesaid series-capacitor elements being of limited voltage-rating, approximating full-load line-current conditions, in combination with capacitor-protective means, associated with each of the aforesaid series-capacitor elements, for protecting the series-capacitor elements against excessive voltages thereacross, and for quickly removing said protection upon the subsidence of the excessive line-current conditions.

18. The invention as defined in claim 7, characterized by the aforesaid series-capacitor elements being of limited voltage-rating, approximating full-load line-current conditions, in combination with capacitor-protective means, associated with each of the aforesaid series-capacitor elements, for protecting the series-capacitor elements against excessive voltages thereacross, and for quickly removing said protection upon the subsidence of the excessive line-current conditions, said protection-removal being sufficiently quick to enable the capacitor, when in service, to assist in maintaining stability.

19. The invention as defined in claim 8, characterized by the aforesaid series-capacitor elements being of limited voltage-rating, approximating full-load line-current conditions, in combination with capacitor-protective means, associated with each of the aforesaid series-capacitor elements, for protecting the series-capacitor elements against excessive voltages thereacross, and for quickly removing said protection upon the subsidence of the excessive line-current conditions, said protection-removal being sufficiently quick to enable the capacitor, when in service, to assist in maintaining stability.

20. The invention as defined in claim 9, characterized by the aforesaid series-capacitance being elements of limited voltage-rating, approximating full-load line-current conditions, in combination with capacitor-protective means, associated with each of the aforesaid series-capacitor elements, for protecting the series-capacitor elements against excessive voltages thereacross, and for quickly removing said protection upon the subsidence of the excessive line-current conditions, said protection-removal being sufficiently quick to enable the capacitor, when in service, to assist in maintaining stability.

21. The invention as defined in claim 10, characterized by the aforesaid series-capacitance being elements of limited voltage-rating, approximating full-load line-current conditions, in combination with capacitor-protective means, associated with each of the aforesaid series-capacitor elements, for protecting the series-capacitor elements against excessive voltages thereacross, and for quickly removing said protection upon the subsidence of the excessive line-current conditions, said protection-removal being sufficiently quick to enable the capacitor, when in service, to assist in maintaining stability.

22. The invention as defined in claim 11, in combination with the steps of by-passing the series-capacitance during excessive line-current conditions, and quickly removing said by-pass upon the subsidence of the excessive line-current conditions, said by-pass-removal being sufficiently quick to enable the series-capacitance, when in service, to assist in maintaining stability.

ROBERT D. EVANS.
ALEXANDER C. MONTEITH.